United States Patent
Wang et al.

(10) Patent No.: US 7,529,531 B2
(45) Date of Patent: May 5, 2009

(54) APPARATUS AND METHODS FOR ESTIMATING A SLEEP CLOCK FREQUENCY

(75) Inventors: Michael Mao Wang, San Diego, CA (US); Chinnappa K. Ganapathy, San Diego, CA (US); Jinxia Bai, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 502 days.

(21) Appl. No.: 11/271,445

(22) Filed: Nov. 9, 2005

(65) Prior Publication Data

US 2007/0105525 A1 May 10, 2007

(51) Int. Cl.
*H04B 14/02* (2006.01)
(52) U.S. Cl. .................... 455/265; 455/343.1
(58) Field of Classification Search .......... 455/343.1, 455/255–258, 265
See application file for complete search history.

(56) References Cited

U.S. PATENT DOCUMENTS

| | | | | |
|---|---|---|---|---|
| 5,613,235 A * | 3/1997 | Kivari et al. | ............... | 455/574 |
| 5,828,248 A * | 10/1998 | Masuda | ............... | 327/113 |
| 5,874,846 A * | 2/1999 | Lee | ............... | 327/299 |
| 5,950,120 A * | 9/1999 | Gardner et al. | ............... | 455/343.1 |
| 6,016,312 A | 1/2000 | Storm et al. | | |
| 6,029,061 A | 2/2000 | Kohlschmidt | | |
| 6,176,611 B1 * | 1/2001 | Schushan et al. | ............... | 368/202 |
| 6,212,398 B1 * | 4/2001 | Roberts et al. | ............... | 455/502 |
| 6,411,830 B2 * | 6/2002 | Alon et al. | ............... | 455/574 |
| 6,453,181 B1 | 9/2002 | Challa et al. | | |
| 6,728,234 B1 * | 4/2004 | Hofmann et al. | ............... | 370/350 |
| 6,961,287 B2 * | 11/2005 | Jung | ............... | 368/155 |

(Continued)

FOREIGN PATENT DOCUMENTS

EP 0586256 3/1994

(Continued)

OTHER PUBLICATIONS

International Search Report PCT/US06/0607476, International Search Authority European Patent Office, Mar. 20, 2007 (050001WO).

*Primary Examiner*—Edward Urban
*Assistant Examiner*—Adeel Haroon
(74) *Attorney, Agent, or Firm*—Mary Fales

(57) ABSTRACT

Apparatus and methods for estimating the frequency of a sleep or slow clock using a fast clock, such as a temperature compensated crystal oscillator. The disclosed apparatus include an estimator having a first counter that receives sleep clock synchronized pulses issuing each cycle of the sleep clock period, yet are synchronized to a fast clock. The slow clock synchronized pulses are counted up to a predetermined number; whereupon a full count signal is issued. A second counter receives the full count signal and increments each time the full count signal is received. A third counter counts fast clock cycles until the full count signal occurs. Based on the number of counts of the slow and fast clock cycles, the frequency of the slow clock may be determined using only the domain of the fast clock for performing the measurement thereby tying accuracy of the measurement to the accuracy of the fast clock. The disclosed apparatus also include an integrated circuit and a transceiver employing the disclosed estimator. Corresponding methods are also disclosed.

44 Claims, 8 Drawing Sheets

U.S. PATENT DOCUMENTS

| | | | |
|---|---|---|---|
| 7,113,810 B2 | 9/2006 | Kim | |
| 7,197,341 B2 | 3/2007 | Bultan et al. | |
| 2007/0105525 A1 | 5/2007 | Wang et al. | |

FOREIGN PATENT DOCUMENTS

| | | |
|---|---|---|
| EP | 0851593 | 7/1998 |
| EP | 0924947 | 6/1999 |
| EP | 0939495 | 9/1999 |
| GB | 2350754 | 12/2000 |
| WO | 0010354 | 2/2000 |
| WO | 0247281 | 6/2002 |

* cited by examiner

APPARATUS AND METHODS FOR ESTIMATING A SLEEP CLOCK FREQUENCY

REFERENCE TO CO-PENDING APPLICATIONS FOR PATENT

The present Application for Patent is related to the following co-pending U.S. Patent Application:

"APPARATUS AND METHOD FOR DETERMINING SLEEP CLOCK TIMING" by Michael Wang et al., Ser. No. 11/271,409, filed concurrently herewith, assigned to the assignee hereof, and expressly incorporated by reference herein.

BACKGROUND

1. Field

The present disclosure relates to methods and apparatus for estimating a sleep clock frequency and, more particularly, estimating a sleep clock frequency using a high performance clock such as a temperature compensated crystal oscillator (TCXO).

2. Background

Mobile transceivers, such as mobile phones, typically employ a temperature compensated oscillator (TCXO) that provides very accurate timing for various functions within the device including keeping the system time. Clocks such as a TCXO, however, use a relatively large amount of power, drawing approximately 1.5 mA of current. In order to improve the battery life of a mobile transceiver, it is known to place most current consuming units within the device into a power saving mode and maintain the system time using low-power sleep circuits. Because of the high current draw of a TCXO, it is not energy efficient to use such a device to maintain system time for sleep circuits.

Accordingly, it is known to maintain system timing during sleep or power saving modes by using a sleep controller having a much lower power usage (e.g., a clock with a current draw of 200 µA) and a lower frequency (e.g., 30-60 kHz) than TCXO devices. This is typically accomplished with a cost effective crystal oscillator clock at the expense of some accuracy in time keeping because the clock frequency tends to fluctuate. This clock is otherwise known as the "sleep clock" or "slow clock."

When a transceiver wakes up from a sleep mode, it is important to have an accurate system time as kept by the sleep clock. Since the slow clock is used for system timing during sleep modes, the accuracy of the clock timing will directly affect the system time when the mobile transceiver wakes up prior to re-acquisition of timing based on information received from the wireless network, such as a CDMA based network. A good estimate of slow clock frequency is therefore desirable. Known timing estimation utilized by mobile devices, however, is typically used only for initial calibration and the slow clock time tracking is solely dependent on Pseudo Noise (PN) code timing. In certain wireless systems not employing PN timing (e.g., Orthogonal Frequency Division Multiplexing (OFDM)), however, this timing in not available. Thus, in such systems the accuracy of the sleep clock timing is even more important. In the case of OFDM, in particular, such systems are more susceptible to timing errors such as synchronization timing made worse by intersymbol interference.

SUMMARY

Apparatus and methods are presently disclosed to provide accurate estimation of a sleep clock frequency by using a fast clock to determine the estimate. In one example, a sleep clock frequency estimator is disclosed including a first counter configured to count sleep clock synchronized pulses having a period corresponding to a period of a sleep clock and synchronized with a fast clock, and to output at least one full count signal when a number of sleep clock synchronized pulses reaches a predetermined number. The estimator further includes a second counter configured to receive the full count signal and increment by a count of one for each full count signal received, and a third counter configured to count fast clock cycles, and output a value of the number of fast clock cycles to at least a first register for storage by the first register for each slow clock cycle.

According to another example, a clock frequency estimator is disclosed having a synchronizer configured to receive a first clock signal and a second clock signal and to output at least one clock synchronization pulse for each cycle of the second clock as synchronized to the first clock. A first counter is also included and configured to receive the at least one clock synchronization pulse, where the first counter is configured to increment a first count with each received clock synchronization pulse, and to output a full count signal when the first count reaches a predetermined number. Furthermore, a second counter is included and configured to receive the full count signal and increment by a count of one each time the full count signal is received and a third counter is included and configured to receive the first clock signal, increment a second count for each first clock cycle received, and output the second count; and at least one register configured to store the second count for each clock synchronization pulse received by the first counter.

In yet another disclosed example, a processing circuit for use in a wireless transceiver includes a synchronizer configured receive a fast clock signal output by a fast clock and a sleep clock signal output by a sleep clock and to output at least one sleep clock synchronization pulse for each cycle of the sleep clock as synchronized to the fast clock; a sleep clock frequency estimator including: a first counter configured to count sleep clock synchronized pulses having a period corresponding to a period of a sleep clock and synchronized with a fast clock, and to output at least one full count signal when a number of sleep clock synchronized pulses reaches a predetermined number; a second counter configured to receive the full count signal and increment by a count of one for each full count signal received; and a third counter configured to count fast clock cycles, and output a value of the number of fast clock cycles to at least a first register for storage by the first register for each slow clock cycle; and a processor configured to receive the count of fast clock cycles during a measurement time period from the at least one register and determine a number of fast clock cycles occurring during the measurement period, to receive counts from the first and second counters and to determine a count of sleep clock cycles occurring during the measurement time period; and determine an estimation of the sleep clock frequency based on the determined counts of fast and slow clock cycles.

In still another example, a wireless device for use in a mobile communications network is disclosed including a synchronizer configured receive a fast clock signal output by a fast clock and a sleep clock signal output by a sleep clock and to output at least one sleep clock synchronization pulse for each cycle of the sleep clock as synchronized to the fast clock. Further, a sleep clock frequency estimator is included having a first counter configured to count sleep clock synchronized pulses having a period corresponding to a period of a sleep clock and synchronized with a fast clock, and to output at least one full count signal when a number of sleep clock synchronized pulses reaches a predetermined number; a second counter configured to receive the full count signal and increment by a count of one for each full count signal received; and a third counter configured to count fast clock cycles, and output a value of the number of fast clock cycles to at least a first register for storage by the first register for each slow clock cycle. Finally, the wireless device includes a processor configured to receive the count of fast clock cycles during a measurement time period from the at least one register and determine a number of fast clock cycles occurring during the measurement period, to receive counts from the first and second counters and to determine a count of sleep clock cycles occurring during the measurement time period; and determine an estimation of the sleep clock frequency based on the determined counts of fast and slow clock cycles.

In yet another example, a method for estimating the frequency of a sleep clock with a fast clock is disclosed. The method includes incrementing a sleep clock counter for each cycle of the sleep clock occurring during a predetermined measurement period as determined by a predetermined number of slow clock cycles; incrementing a fast clock counter for each cycle of the fast clock to determine a fast clock cycle count and storing the counted number of fast clock cycles in at least one register occurring during each slow clock cycle of the predetermined measurement period; determining a number of sleep clock cycles of the sleep clock counter and a number of fast clock cycles stored in the at least one register; and determining an estimated frequency of the sleep clock based on the determined number of sleep clock cycles and the determined number of fast clock cycles stored in the at least one register.

In still another disclosed example, a computer readable medium has instructions stored thereon, the stored instructions, when executed by a processor, causing the processor to perform a method of estimating the frequency of a sleep clock with a fast clock The performed method includes: incrementing a sleep clock counter for each cycle of the sleep clock occurring during a predetermined measurement period as determined by a predetermined number of slow clock cycles; incrementing a fast clock counter for each cycle of the fast clock to determine a fast clock cycle count and storing the counted number of fast clock cycles in at least one register occurring during each slow clock cycle of the predetermined measurement period; determining a number of sleep clock cycles of the sleep clock counter and a number of fast clock cycles stored in the at least one register; and determining an estimated frequency of the sleep clock based on the determined number of sleep clock cycles and the determined number of fast clock cycles stored in the at least one register.

According to yet another example, an apparatus for estimating the frequency of a sleep clock with a fast clock includes: means for synchronizing a sleep clock with a fast clock and forming a synchronized pulse for each slow clock cycle synchronized with the fast clock; means for incrementing a sleep clock count for each cycle of the sleep clock occurring during a predetermined measurement period as determined by a predetermined number of slow clock cycles; means for incrementing a fast clock count for each cycle of the fast clock to determine a fast clock cycle count; means for storing the counted number of fast clock cycles occurring during each slow clock cycle of the predetermined measurement period; means for determining a number of sleep clock cycles from the sleep clock count; means for determining a number of fast clock cycles stored in the means for storing; and means for determining an estimated frequency of the sleep clock based on the determined number of sleep clock cycles and the determined number of fast clock cycles.

DETAILED DESCRIPTION

The present application discloses apparatus and methods for estimating the frequency of a first type of clock (e.g., a slow or sleep clock) using another, more accurate type of clock (e.g., a TCXO fast clock). Additionally, the disclosed method and apparatus provide an up to date, continuous estimate measured over a predetermined length that minimizes clock drifting effects of the first type of clock.

Figure 1:
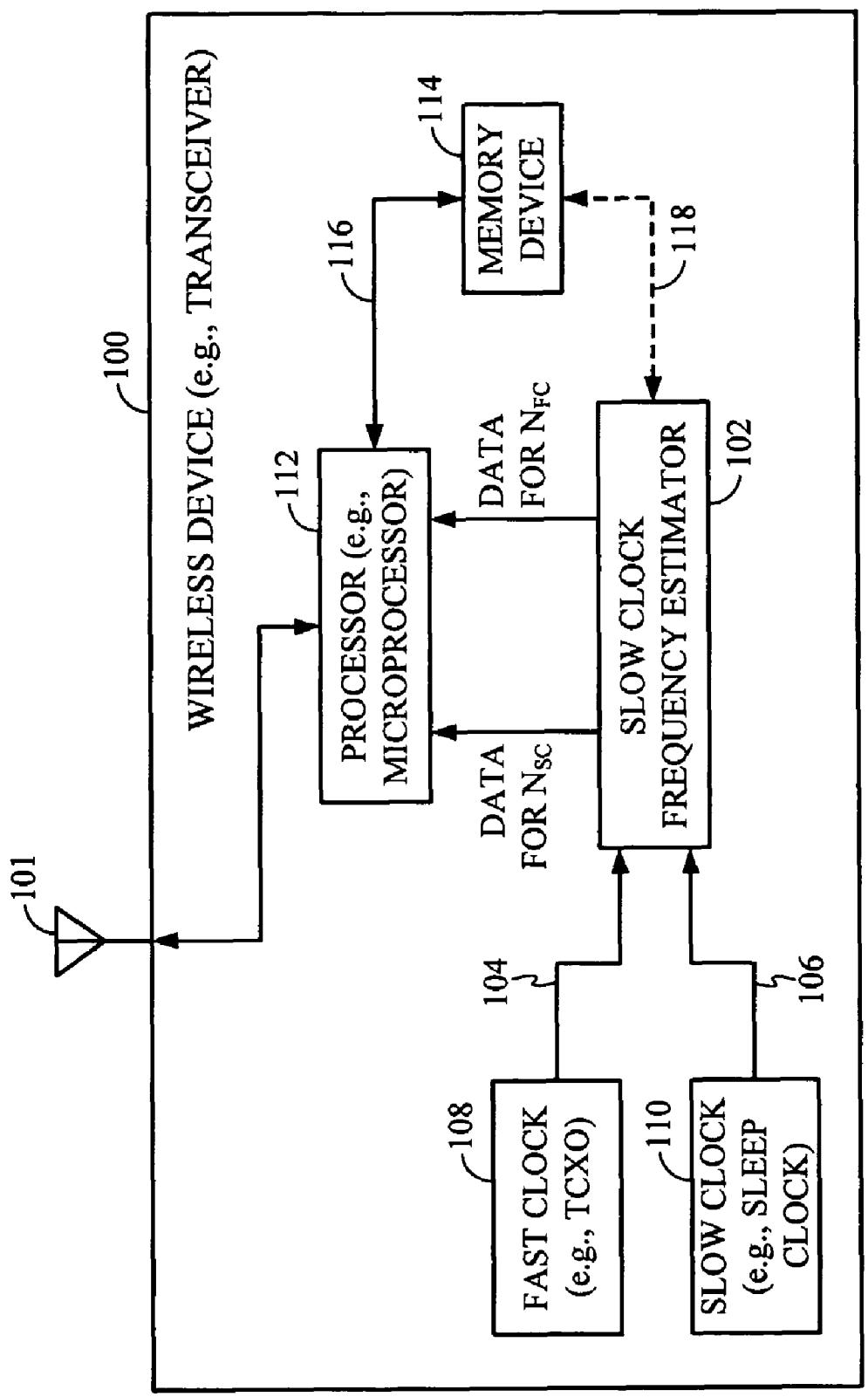
FIG. 1 is a block diagram of an exemplary wireless device utilizing a sleep clock frequency estimator according to the present disclosure.

FIG. 1 illustrates an exemplary wireless apparatus 100 used in a mobile network, such as a mobile transceiver. The wireless device 100 receives and transmits wireless communication signals to other devices, such as a base station via an antenna 101. The wireless device 100 includes a slow or sleep clock frequency estimator 102 for estimating a slow clock frequency using a fast clock. As shown, the clock estimator 102 receives clock signals 104 and 106 from a fast clock 108 and a slow clock 110, respectively. Fast clock 108 is a TCXO or similar device, which operates at a relatively high frequency (e.g., 44.4 MHz or 66.6 MHz) compared to slow clock 110 and has a higher degree of timing accuracy. In contrast, the slow clock 110 is a type of oscillator that operates at a lower frequency (e.g., 30-60 kHz) and consumes less power making it more ideal for sleep timing.

The fast and slow clocks 108 and 110 operate independently and are asynchronous with each other. Slow clock frequency estimator 102 is configured to count the number of slow clock cycles by counting fast clock cycles, thus providing higher accuracy in estimating the actual slow clock frequency. Since the slow and fast clocks are asynchronous, the estimator 102 includes a synchronizer (not shown in this figure) that synchronizes the fast clock to the slow clock. The estimator 102 may then determine a count of the number of cycles of the slow clock ($N_{SC}$) using the fast clock, as well as a count of the number of fast clock cycles ($N_{FC}$) occurring during the number of slow clock cycles. Estimator 102 provides this information to a microprocessor 112, which may actually simply read count data from registers within the estimator 102 to determine $N_{SC}$ and $N_{FC}$ and derive an up to date estimate of the slow clock frequency. This reading of the count data could be performed at any time, as the estimator 102 operates continuously in active or awake mode in one example. In one example, the microprocessor would read the data prior to the microprocessor 112 directing that the system 100 enter a sleep mode, for the purpose of setting the sleep mode timer before the mobile 100 is put to sleep, for example.

Estimator 102 continuously counts the slow clock 110 as long as the mobile 100 is awake in order to minimize the quantization error as well as the slow clock fluctuation error according to this example. Due to the asynchronousness between the fast and slow clocks, the measurement error of $N_{FC}$ ranges from −1 to +1 fast clock chips or cycles. The estimated frequency of the slow clock $f_{SC}$ may be calculated by the microprocessor 112 and derived based on the following relationship:

$$f_{SC} = \frac{f_{FC} N_{SC}}{N_{FC}} \quad (1)$$

where $f_{FC}$ is the fast clock frequency, $N_{SC}$ is the number of slow clock cycles counted, and $N_{FC}$ is the number of fast clock cycles counted. $N_{SC}$ and $N_{FC}$ are read from registers (to be discussed later) in the estimator 102.

Additionally, it is noted that the estimate error $\epsilon$ for estimator 102 according to the present disclosure may be determined by the following relationship:

$$\varepsilon = \frac{1}{T_{measure} f_{FC}} + \varepsilon^{FC} + \varepsilon^{SC} \quad (2)$$

where $T_{measure}$ is the continuous measure time that is bounded by the mobile 100 awake time, $\epsilon^{FC}$ is error of the fast clock, such as that due to automatic frequency control (AFC) of the TCXO fast clock 108, and $\epsilon^{SC}$ is error of the slow clock 110, such as sleep clock drift. If one ignores the fast clock AFC error and sleep clock drift assuming the continuous measure time is short enough that no significant drift occurs, the error due to ±1 quantization can be expressed as:

$$\varepsilon \approx \frac{1}{T_{measure} f_{FC}}. \quad (3)$$

Figure 2:
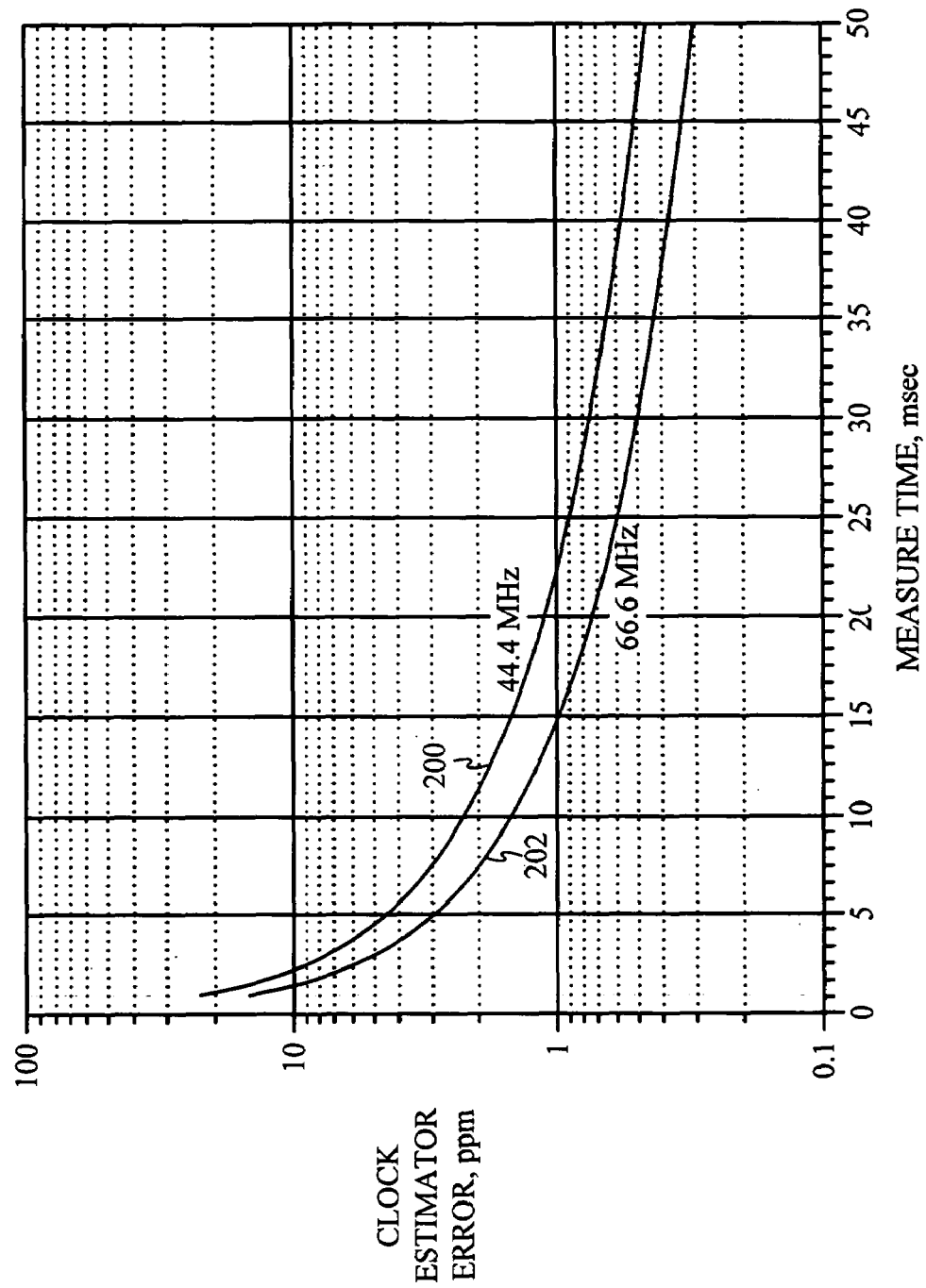
FIG. 2 illustrates a plot of the relationship between measurement error and measure time that the error.

As may be seen from equation (3), the error is inversely proportional to the continuous measure time and the fast clock frequency. Thus, as either the continuous measure time or fast clock frequency increase, the error will decrease. FIG. 2 illustrates a plot of this relationship, showing that the error, measured in parts per million (ppm), decreases rapidly for longer measurement times and is less given a higher clock frequency (e.g., curve 200 showing 44.4 MHz verses curve 202 showing 66.6 MHz). As an example, if the fast clock frequency is 44.4 MHz and the measure time is 4 msec (which would be equivalent to five OFDM symbols, as an example), the estimation error would be approximately 5.5 ppm, whereas if the measure time is increased to 40 msec, the error is reduced to approximately 0.55 ppm.

From FIG. 2, it is therefore apparent that the longer the measurement time, the better the estimation accuracy. The advantage of a longer measure time is diminished, however, by the fact that if the time measure is increased too much, estimation errors can again be introduced due to frequency drift of the sleep clock. Thus, estimator 102 according to the present disclosure is configured to balance the disadvantages of too short and too long measurement times. Accordingly, estimator 102 is designed to start counting as soon as mobile 100 wakes up and keeps counting as long as TCXO fast clock 108 is up so as to maximize the measurement time. On the other hand, the older measurements are discarded if they exceed a predetermined length in order to minimize the slow clock drifting effects. Accordingly, the measurements kept in registers within the estimator 102 are the most up to date. Other features of the disclosed estimator 102 is that measurement is available any time it is requested (i.e., no delay) and the counting process is never interrupted so that the quantization error is minimized.

It is noted that the wireless device 100 of FIG. 1 may also include a memory device 114 or any other suitable computer readable medium that stores instructions for causing the processor 112 to execute a methodology or algorithm to carry out the sleep clock estimation. As indicated the memory device 114 provide storage for delivery to the processor 114 as indicated by connection 116. Alternatively, if the estimator 102 is configured to be able to execute software, the memory device 114 may also cause the estimator to perform the methodology or algorithm as indicated with dashed line 118.

Figure 3:
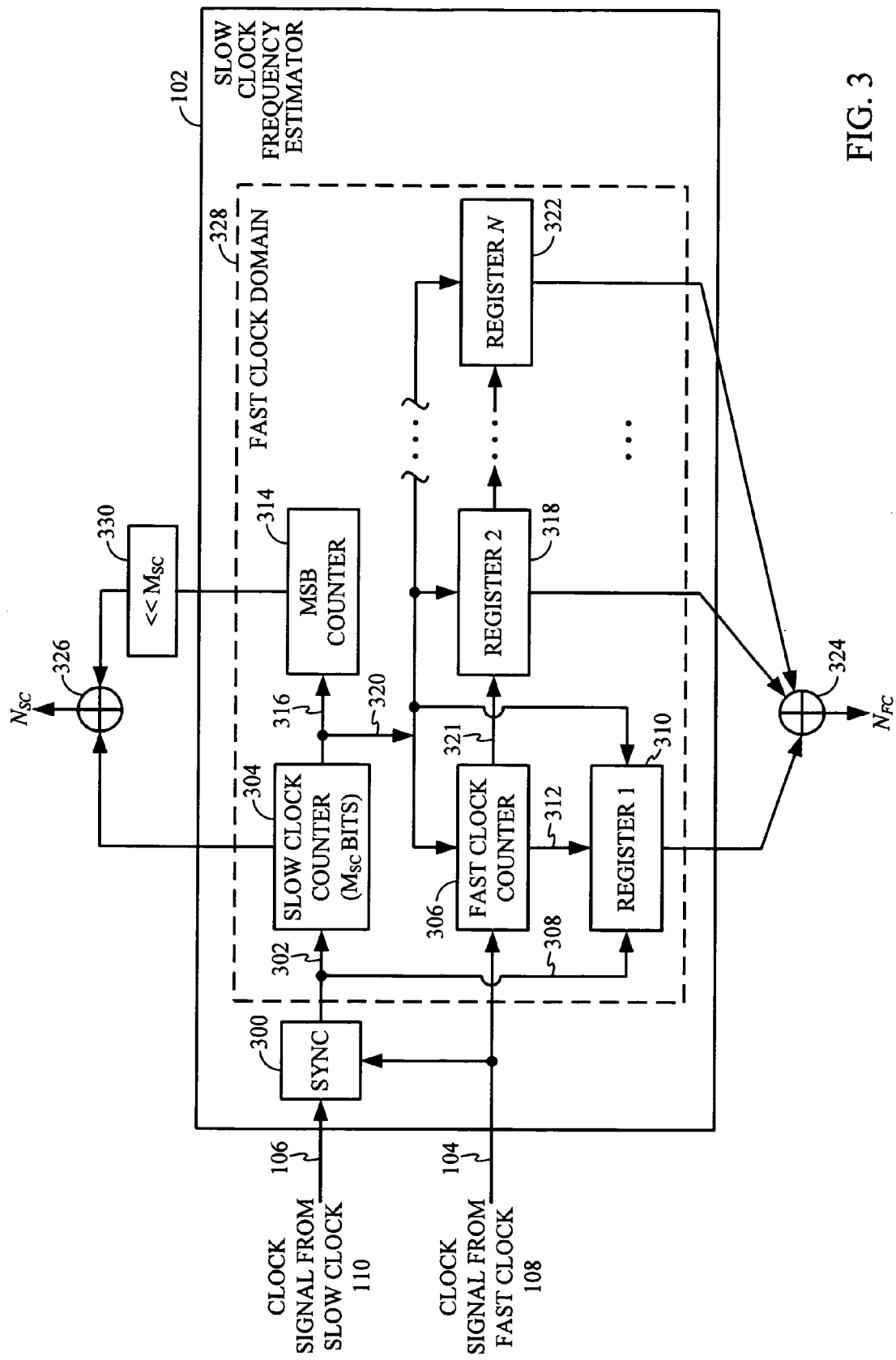
FIG. 3 is a block diagram of an exemplary configuration of the slow clock frequency estimator of FIG. 1.

FIG. 3 illustrates a block diagram of an exemplary configuration of the slow clock frequency estimator 102 of FIG. 1. As mentioned previously, the slow clock 110 and the fast clock 108 are asynchronous and, thus, the slow clock must first be synchronized to the fast clock in order to measure the frequency of the slow clock with the fast clock. Accordingly, the estimator 102 includes a synchronizer 300 that receives both the fast and slow clock signals 104 and 106. The synchronizer 300 receives the signals 104, 106, synchronizes the slow clock to the fast clock, and outputs a sleep clock synchronized pulse 302 for each cycle of the slow clock 110 where the clock synchronized pulse has a rising edge, for example, synchronized with a rising or falling edge of a fast clock signal. The synchronizer 300 may be implemented using a double register, a delay register, or any other known device for synchronizing two asynchronous signals.

A slow clock counter 304 receives the sleep clock synchronized pulses 302 from the synchronizer 300 and counts the pulses 302 as they are received. For every slow clock cycle or, in other words, sleep clock synchronized pulse 302, the slow clock counter counts 304 another slow clock cycle. In an example, the slow clock counter 304 may have a capacity of $M_{SC}$ bits and, thus, has a maximum or predetermined count of $2^{M_{SC}}$ numbers, which is, in part, used to limit the measurement time. As a further, quantitative example, if the number of bits of counter 304 is 11 (i.e., $M_{SC}$=11), the predetermined count is 2048 slow clock cycles. This number may be more or less than 2048, however, depending on whether a longer or shorter measurement time is desired.

Estimator 102 also includes a fast clock counter 306 that receives the fast clock signal 104 from fast clock 108 and counts fast clock cycles. For every slow clock cycle or, in other words, sleep clock synchronized pulse 302, the slow clock counter counts 304 another cycle and the fast clock counter 306 is triggered by the sleep clock synchronized pulse 302 (or a delayed sleep clock synchronized pulse to ensure that all of the fast clock cycles occurring during the slow clock cycle are accounted for as will be explained later in connection with the example of FIG. 5) to read the count of the fast clock counter 306 to a storage register 310, designated "register 1" via a connection 312. The current count value of the fast clock counter 306 is read to register 310 for each slow clock cycle until the count of slow clock counter 304 reaches the predetermined count of $2^{M_{SC}}$. It is noted that the counter 306 may continue to increment without being reset. Thus the value read to register 310 (register 1) for each slow clock cycle overwrites the previous value stored in the register 310. One of ordinary skill in the art will appreciate, however, that alternative arrangements could be utilized to effect counting the number of fast clock cycles occurring per a predetermined number of slow clock cycles. For example the counter 306 could be reset for each slow clock cycle and the register 310, could instead be an accumulative counter that adds the current value of counter 306 to a previous sum of count values received from the counter 306 up to the time at which the slow clock counter 304 has reached its predetermined limit.

Once the slow clock counter 304 reaches the predetermined limit (e.g., rolls over), the slow clock counter 304 sends a Most Significant Bit (MSB) signal (e.g., a bit value "1" indicating that the most significant bit of the counter 304 has reached a "1" value) to a Most Significant Bit (MSB) counter 314 via connection 316, which increments the MSB counter 314. Thus, MSB counter 314 effectively counts the number of times that the slow clock counter rolls over, i.e., each time the MSB becomes "1." Concurrent with issue of the MSB, the slow clock counter 304 (as shown in the example of FIG. 3) triggers the fast clock counter 306 with the MSB via connection 320 to read the current value of the fast clock counter 306 into another, second register 318 labeled as "Register 2," via connection 321. Additionally, when the MSB counter 314 is incremented, the first register 310 is reset to a count of zero (0) via connection 320. The first register 310 is used in this example to ensure that an accurate count of fast clock cycles occurring up to the last slow clock cycle may be obtained at any time (e.g., immediately prior to the microprocessor 112 entering a sleep mode) for use in obtaining $N_{FC}$. Thus, the end of a sleep clock cycle is not necessary to obtain a current count.

Figure 4:
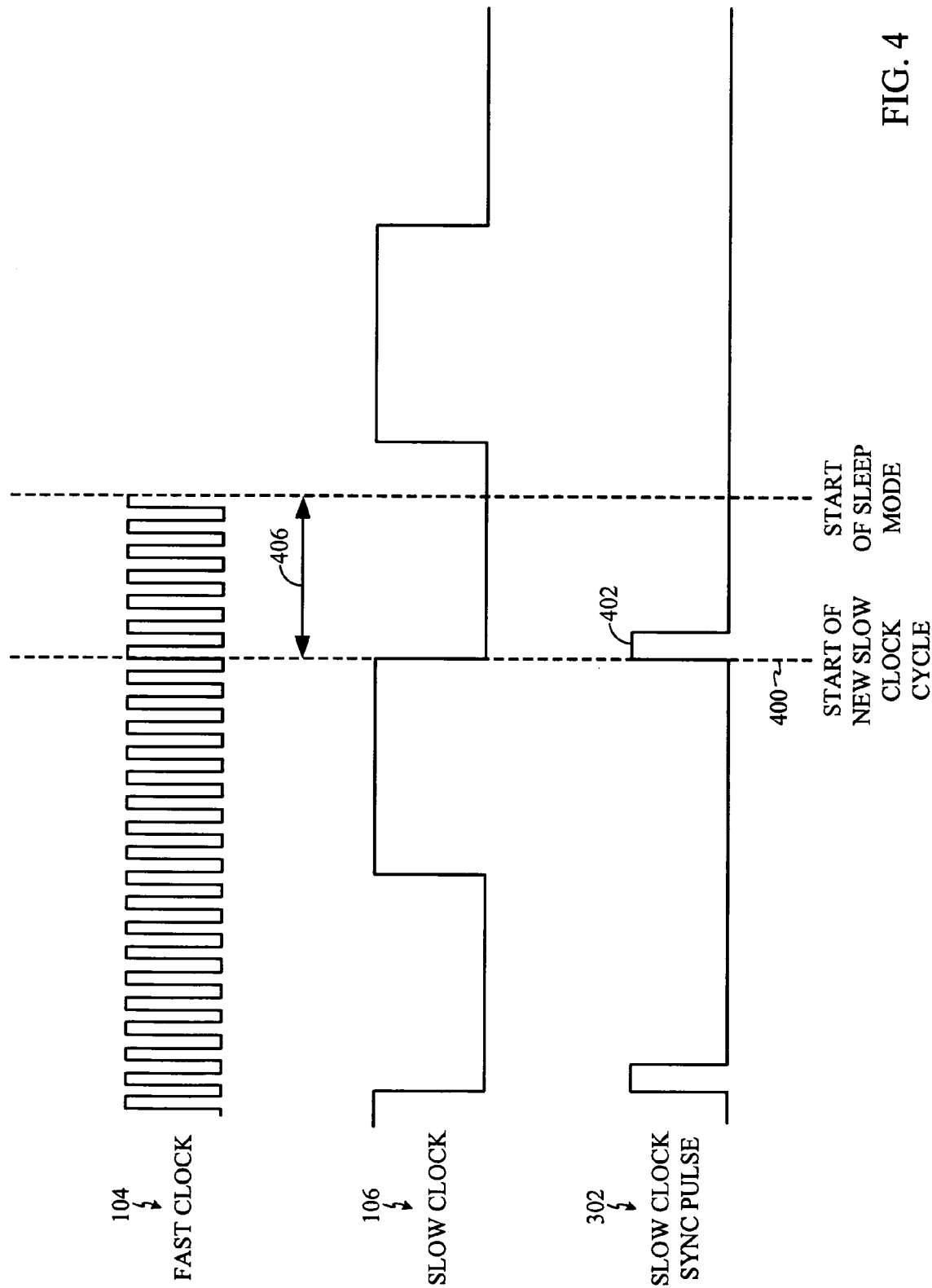
FIG. 4 is a timing diagram of the relationship between signals occurring with the estimator of FIG. 3.

FIG. 4 illustrates, however, that when the mobile 100 enters a sleep mode prior to the end of a slow clock cycle, some of the count of the fast clock is lost. Nonetheless, the accuracy of the count will be at worst ±1 slow clock cycles. In particular, FIG. 4 illustrates a timing diagram of the relationship between the fast clock signal 108, the slow or sleep clock signal 110, and the sleep clock synchronized pulse 302, which enables the register 310 to store the count of the fast clock counter 306. When a new slow clock cycle starts, as indicated by time line 400, the pulse 402 causes the register 310 to store the pull the current count from fast clock counter 306. If sometime later in the next slow clock cycle the microprocessor decides to put the mobile 100 into sleep mode, as indicated at time line 404, the current number of fast clock pulses occurring during the interim period, as indicated by arrow 406, is not stored to register 310. Nonetheless, the number of fast clock pulses $N_{FC}$ is counted up to the end of the last slow clock cycle (i.e., time line 400), which is an accuracy of at worst ±1 slow clock cycles.

Referring back to FIG. 3, estimator 102 also includes additional registers through a number "N," the final register "N," shown designated with reference number 322. The use of additional registers 2 (318) through N (322) ensure that a court of at least $2^{M_{SC}}$(N−1) slow clock cycles worth of fast clock count for an awake period greater than that number of slow clock cycles. Additionally, by limiting the number of registers to an "N" amount, only the most recent count of slow clock cycles is provided. As an example, assuming that the frequency of the slow clock 110 is approximately 32 kHz, the number of $M_{SC}$ bits of the slow clock counter 304 is 11 and N is limited to two (2) registers, the maximum counting period would be approximately equal to $2^{M_{SC}}/f_{SC} \times N = (2^{11}/32 \text{ kHz}) \times 2 = 128$ msec. This is merely an example, and more registers than two may be utilized to achieve longer measure times. Additionally, one of ordinary skill in the art will appreciate that a single register (e.g., register 1 (310)) could be utilized in the estimator of FIG. 3, but that this would only provide a short measurement time of a maximum of $2^{M_{SC}}$ number of slow cycle's worth of fast clock counts (approximately 64 msec). It is further noted that the combination of the fast clock counter 306 and registers 1 through N could be implemented as a single unit that counts fast clock cycles during a measurement period of the slow clock counter 304 in conjunction with the MSB counter 314. This single unit would be configured such that a current count of fast clock cycles can be obtained up to the last occurring full slow clock cycle. Similarly, the slow clock counter 304 and MSB counter 314 could be configured as a single unit that counts the sleep clock synchronized pulses 302.

FIG. 3 further illustrates adders 324 and 326 that respectively calculate the fast and slow clock counts $N_{FC}$ and $N_{SC}$. In the case of the fast clock count $N_{FC}$, the counts stored in each of registers 1-N (e.g., 310, 318, 322) are read out and added together by adder 324 to derive $N_{FC}$. In the case of the slow or sleep clock count $N_{SC}$, the counts from the slow clock counter and the MSB counter 314 are summed by adder 326. The MSB counter 314 only delivers most significant bits each signifying an already counted $2^{M_{SC}}$ slow clock cycles that are then added to the current count of the slow clock counter to provide a total slow clock cycles during, at maximum, the maximum time measure period. In an example, a shift register 330 may be used to move the count of MSB counter 314 to the adder 326. It is noted that the adders 324 and 326 (and shift register 330) are not shown as part of the estimator 102, and may be implemented within the microprocessor 112, or separately from both the estimator 102 and microprocessor 112. Alternatively, the adders 324, 326 may be logic contained within an ASIC, for example, housing the estimator 102.

When the microprocessor 112 decides to place the mobile device 100 in a sleep mode, the microprocessor 112 obtains the fast and slow clock counts $N_{FC}$ and $N_{SC}$ and calculates an estimate of the slow clock frequency from these numbers according to equation (1) above, as an example. When the microprocessor 112 wakes up, all of the registers and counters are reset by a wakeup signal from the microprocessor 112 each time that the mobile wakes up. The estimator 102 will then keep running without interruption until the mobile 100 goes to sleep.

It is noted that the portions of the estimator 102 that are used to derive the counts $N_{FC}$ and $N_{SC}$ are all part of the domain of the fast clock, as indicated by dashed line 328 in FIG. 3. This ensures that estimator 102 only uses the fast clock 108 to perform the counts in order to achieve a more accurate estimate than could be obtained using the less accurate, less power consumptive slow clock 110.

Figure 5:
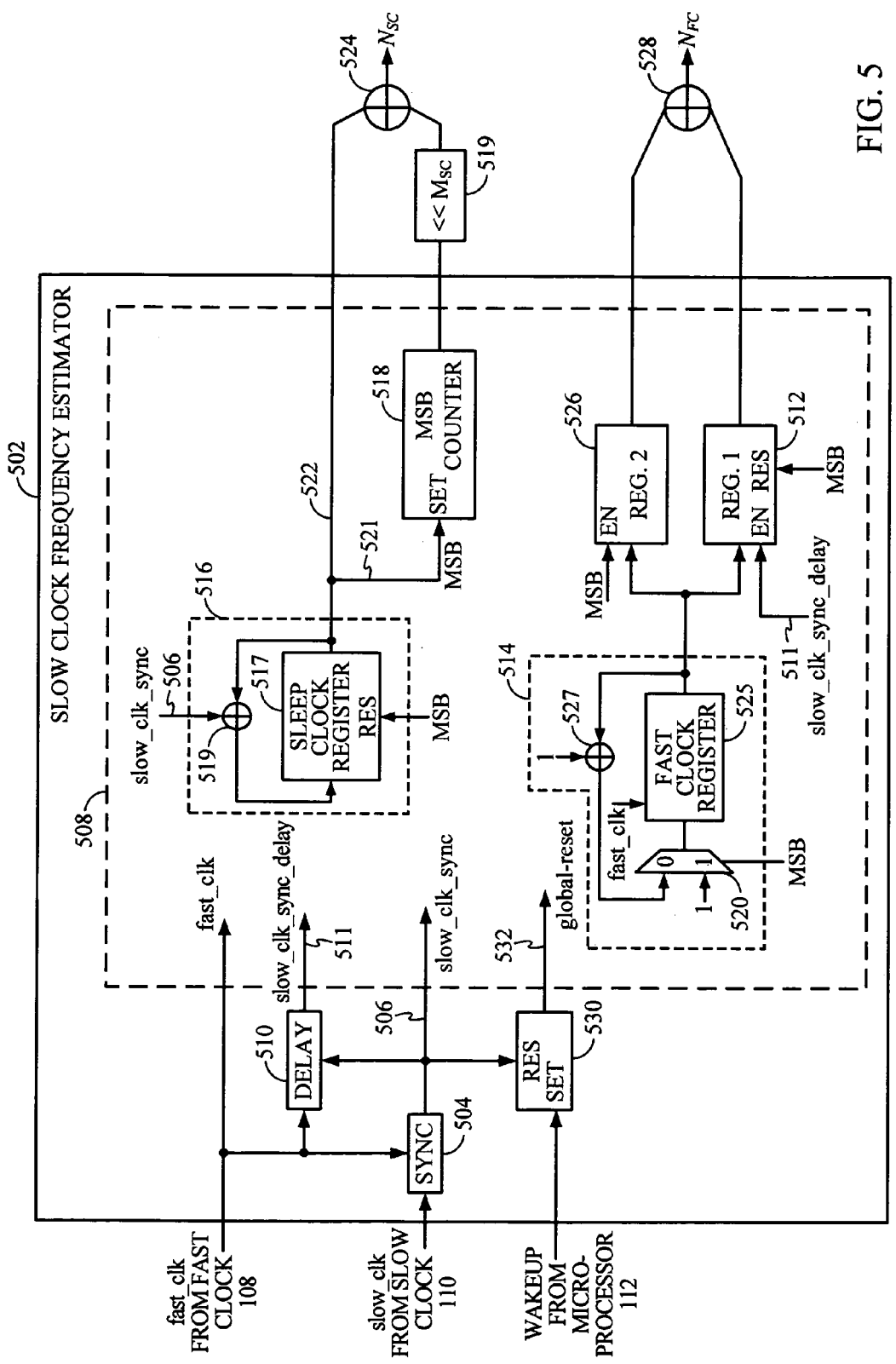
FIG. 5 illustrates a block diagram of another exemplary sleep clock frequency estimator according to the present disclosure.
Figure 6:
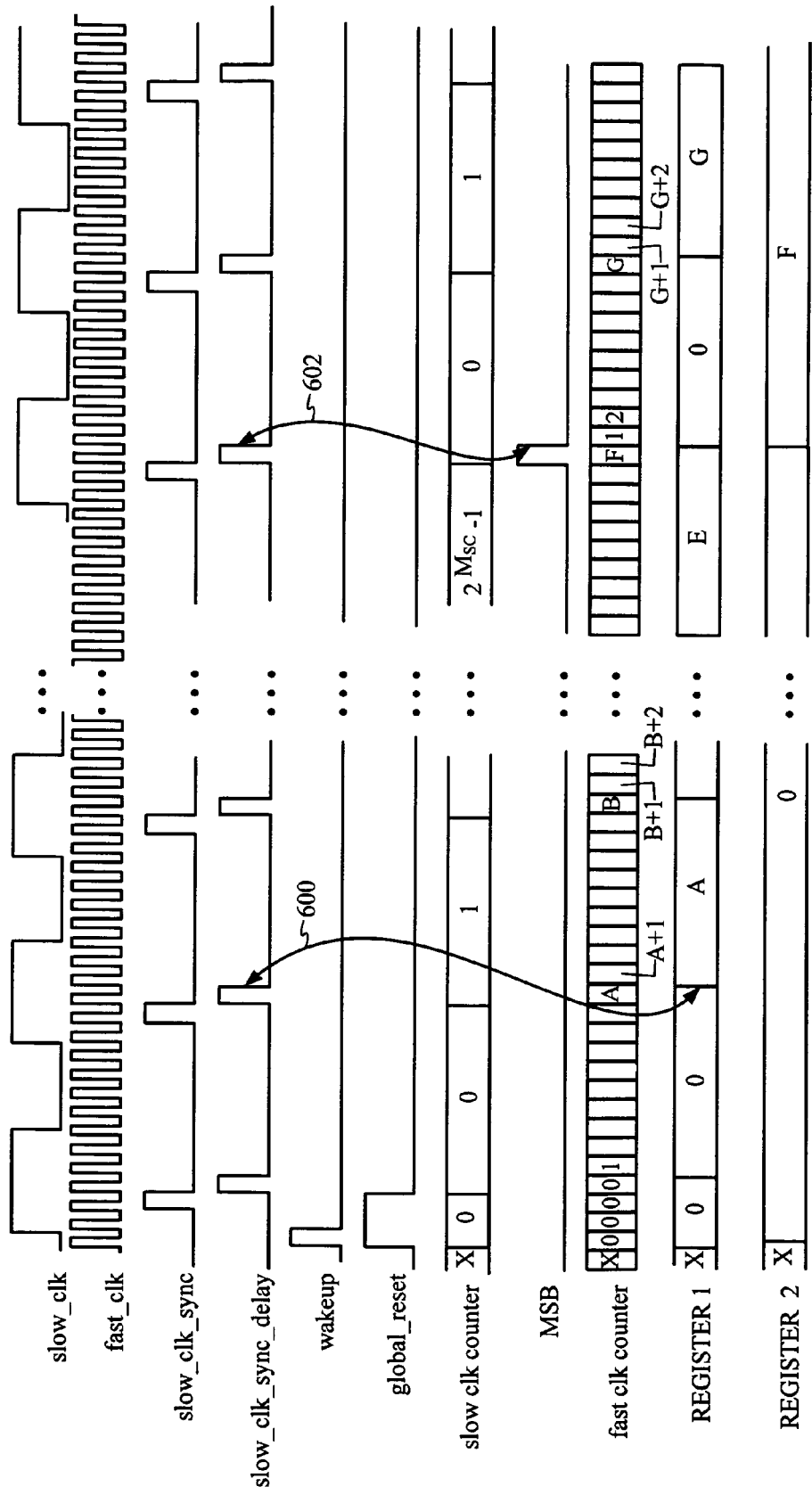
FIG. 6 is a timing diagram illustrating the various signals and counts occurring in the estimator of FIG. 5.

Another example of a slow clock frequency estimator similar to estimator 102 in FIG. 3 is shown in FIGS. 5 and 6. The example of FIG. 5 includes an estimator 502 that receives the fast clock signal (fast_clk), the slow clock signal (slow_clk) and a wakeup signal from a microprocessor, such as microprocessor 112, for example. Similar to the example of FIG. 3, a synchronizer 504 receives the slow_clk signal, synchronizes the slow_clk signal to the fast_clock signal, and outputs a sleep clock synchronized pulse 506, labeled as slow_clk_sync, which is akin to signal 302 in the example of FIG. 3. The fast_clk and slow_clk_sync signals are input to the fast clock domain portion 508 of the estimator 502. Additionally, the estimator includes a delay circuit 510 that delays the sleep clock synchronized pulse 506 by a predetermined amount of time, such as one fast clock period. The delay circuit 510 outputs a slow_clk_sync_delay pulse 511 that is used to enable a first register 512 to receive a count from a fast clock counter 514, as will be discussed later. It is noted that the delay circuit 510 may be implemented with any suitable device that outputs a signal input at some predetermined delay period.

Similar to the example of FIG. 3, the estimator 502 includes a slow or sleep clock counter 516 having a $M_{SC}$ number of bits that affords a count up to a limit of $2^{M_{SC}}$ (N-1) values, assuming a count that starts at zero (0). In the particular example shown, the sleep clock counter 516 includes a sleep clock register 517 and an adder 519. The register 517 simply stores a count value input from the adder 519. The adder determines the count value by adding the previously stored count value output by register 517 via a feedback connection to a "1" input, which is the next slow_clk_sync pulse 506. Thus, the slow_clk_sync pulse 506 effectively increments the counter 516.

Once the slow clock counter 516 reaches its limit, the counter 516 sets an MSB counter 518 with only one bit of data (i.e., the most significant bit), as illustrated by connection 521 derived from bus connection 522, which is the output of the sleep clock counter 516. The MSB counter, in turn, 518 then provides the MSB back to the sleep clock counter 516 to reset the count to zero or, more specifically, to reset the sleep clock register 517 to a value of zero. The slow clock counter 516 and the MSB counter 518 deliver their respective count 522 and bit to an adder 524, which is external to the fast clock domain (and the estimator 502 is no adding logic is contained therein), to determine the number of slow clock cycles $N_{SC}$.

The fast clock counter 514 continuously counts the number of fast clock cycles. As may be seen in FIG. 5, the fast clock counter 514 includes a fast clock register 525, an adder 527, and a multiplexer 520, which receives an input of the MSB. When the value of the MSB has not yet been reached value (i.e., the sleep clock counter 516 has not yet counted $2^{M_{SC}}$ number of slow clock cycles), the multiplexer 520 outputs whatever value is present at input "0". Correspondingly, when the MSB has a value of one (1), the multiplexer 520 outputs whatever value is present at input "1". In the present example of FIG. 5, the value input is "1," which serves to reset fast clock register 525 to the value "1."

Adder 527 receives inputs from the output of the fast clock register 525 and a value of "1" as may be seen in the FIG. 5. Accordingly, when MSB is zero, the adder 527 outputs the sum of the current value of fast clock register 525 and the value 1 to the multiplexer input "0", Output of the stored value of fast clock register 525 is triggered by the fast_clk signal as illustrated. Accordingly, the adder 527 serves to increment to the count of fast clock for each fast clock cycle. The output of adder 527 is delivered to input 0 of multiplexer 520, passes through the multiplexer 520 to be input for storage in the fast clock register 525, and thereby updates the count stored in fast clock register 525.

The first register 512 includes an enable ("EN") input that is triggered by the slow_clk_sync_delay pulse 511. When the pulse 511 is received, the first register 512 receives or reads the count stored in register 525 of the fast clock counter 514. Reading of the count from register 525 is delayed for a predetermined time period as set by the delay circuit 510 since register 512 is trigged by the slow_clk_sync_delay pulse 511. By delaying the reading of the count from the fast clock counter 514, this ensures that the fast clock count includes all of the fast clock cycles for the period of the sleep clock to account for counting delay in the fast clock counter 514. This timing coincidence is illustrated in FIG. 6 by arrow 600 showing that the shift of count information from the fast clock counter 514 to the first register occurs after the fast clock counter 514 has started counting for a next slow clock cycle. When the slow clock counter 516 reaches the count limit as determined by $2^{M_{SC}}$ the MSB is used to reset the first register 512 to a value of zero (0). Simultaneously, the MSB enables a second register 526 (termed "Register 2") to read the count stored in the fast clock register 525 prior to reset of the register 525 to "1" through the operation of multiplexer 520. Thus, the second register 526 stores the number of fast clock cycles that occurred during the first $2^{M_{SC}}$ number of slow clock cycles.

It is noted that FIG. 5 illustrates an estimator having a number N set to two (2). That is, the maximum counting period is limited to a period of approximately 128 msec, given the assumptions discussed previously with respect to FIG. 3. Accordingly, only first and second registers 512, 526 are illustrated in FIG. 5 (i.e., N=2). As may be seen in FIG. 6, the slow_clock_sync_delay pulse is coincident with the MSB bit. Thus, no counted cycles of the fast counter are dropped and the shift of the count from the fast clock counter 514 to the second register 526 does not interrupt the fast clock counter 514 as illustrated by arrow 602 in FIG. 6. Then, similar to the example of FIG. 3, the stored counts of the first and second registers 512 and 526 are fed to an adder 528 to determine the number of fast clock cycles $N_{FC}$.

Of further note, a wakeup signal sent from processor 112, for example, is received by a global reset circuit 530 that issues a global reset signal 532 to reset all of the count values of all registers and counters within the fast clock domain 508 of the estimator 502. The wakeup signal is typically sent at or shortly after the start of a wakeup mode for the mobile device in which the estimator 502 is incorporated. The global reset circuit 530 is reset by the slow_clk_sync signal 506 from the synchronizer 504, which resets circuit 530 until a next wakeup signal is received, such as at the start of the next wakeup mode.

The exemplary implementation of FIGS. 5 and 6, in particular, ensures the fast clock counting process is not interrupted during the shift operations, such as shifts of count information from the fast clock counter to the first register.

Figure 7:
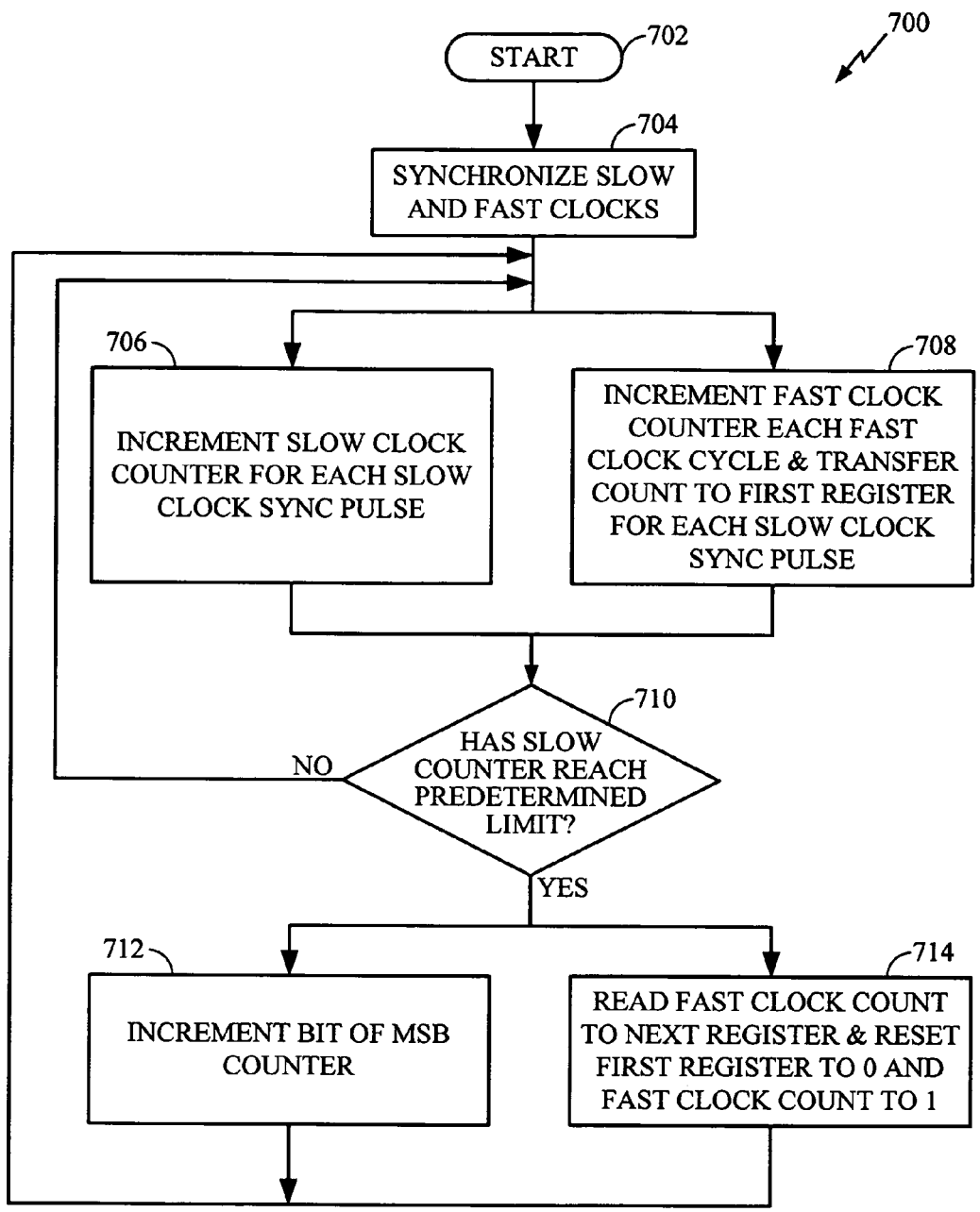
FIG. 7 is a flow diagram of an example of a method for estimating a sleep clock frequency.

FIG. 7 illustrates a flow diagram of a method or operation for the estimators of FIGS. 3 and 5. As shown, the process 700 starts at block 702. Flow proceeds to block 704 where the slow clock is synchronized to the fast clock, such as by synchronizer 300 of FIG. 3 or 510 of FIG. 5. Once the fast and slow clocks are synchronized, the estimator begins counting slow and fast clock pulses based solely on use of the fast clock. As was described previously, a slow clock counter (e.g., 304 or 516) is incremented for each slow clock sync pulse (e.g., 302 or 506) as illustrated in block 706. Concomitantly, the fast clock counter (e.g., 306 or 514) is incremented for each fast clock cycle and the count transferred from the fast clock counter to the first register (e.g., 310 or 512) for each slow clock sync pulse as indicated in block 708.

Flow then proceeds to decision block 710, where the estimator configuration determines if the slow clock counter has reached its predetermined limit. Note that in the examples of FIGS. 3 and 5, this determination occurs as a result of the hardware configuration and it is not necessary that a logic device make this determination. If the slow clock counter has not reached its limit, the flow loops back for execution of the processes of blocks 706 and 708. Conversely, when the slow clock counter limit is reached, flow proceeds to block 712 where the slow clock counter (304 or 516) achieves a maximum count (i.e., the MSB becomes "1"), the MSB counter (e.g., 314 or 518) is then incremented as shown in block 712. Simultaneously, the fast clock count is read to a subsequent or next register (e.g., 318, 322, or 526) and the first register is reset to zero (0) and the fast clock count set back to one (1) as indicated in block 714. Flow then proceeds back prior to blocks 706 and 708, for repeat of the process. It is noted that the flow of process 700 is terminated (not shown) whenever the microprocessor puts the mobile device to sleep and restarts after the mobile device is awakened.

Figure 8:
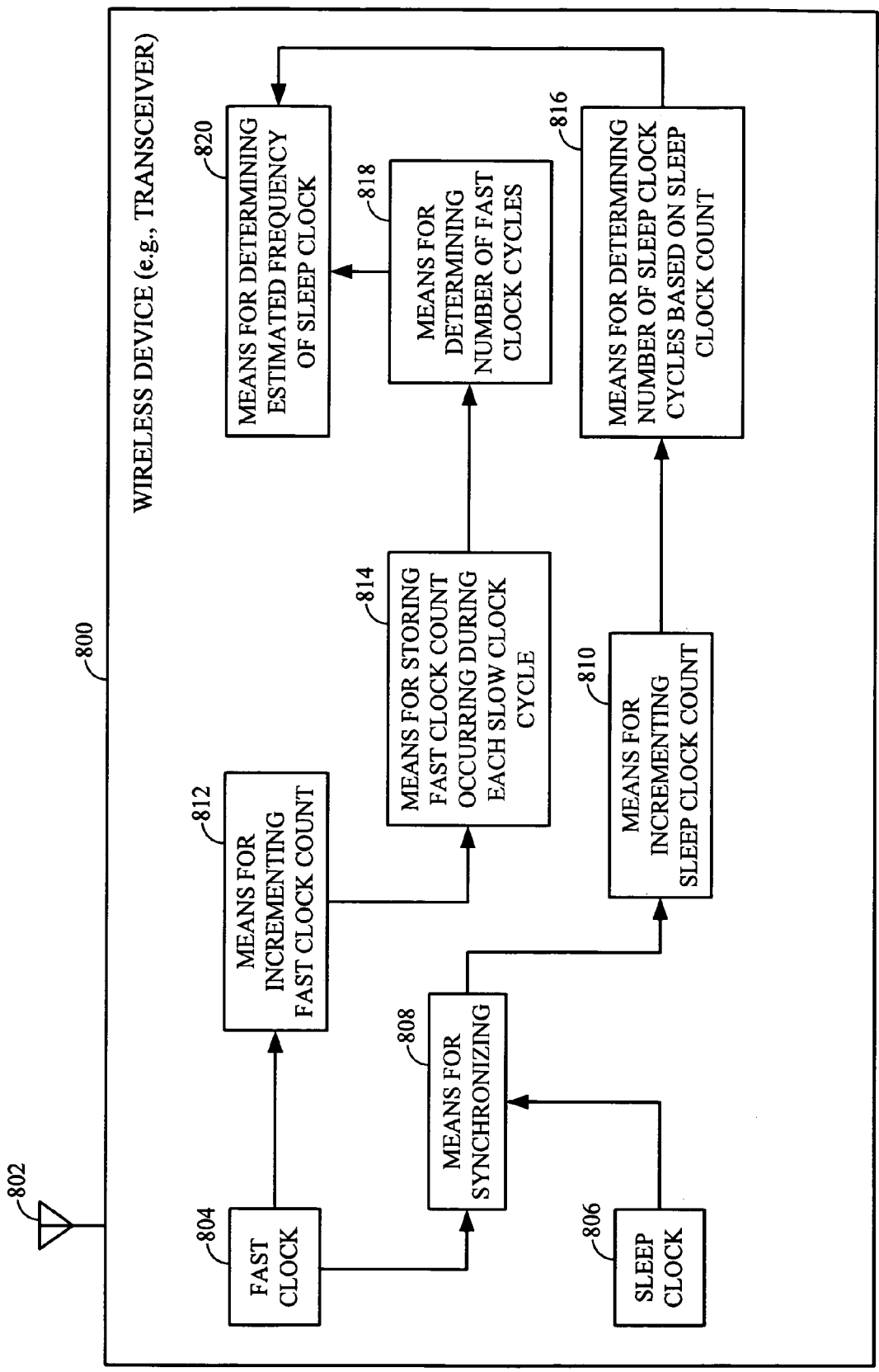
FIG. 8 is a block diagram of another example of an apparatus for use is estimating sleep clock frequency.

FIG. 8 illustrates another example of a wireless apparatus for use in communication system that utilizes sleep clock frequency estimation. As shown, the apparatus 800 includes an antenna 802 to effect receiving and transmitting of wireless communication signals. As illustrated, the apparatus 800 includes a fast clock 804 and a sleep or slow clock 806. A means for synchronizing 808 receives the fast and slow clock signals and consequently forms a synchronized pulse for each slow clock cycle that is synchronized with the fast clock. As an example, this synchronizing means 808 could be implemented with the synchronizer 300 shown in FIG. 3. The synchronizing means 808 means delivers the synchronized pulse to a means for incrementing a sleep clock count 810, which increments the sleep clock count for each cycle of the sleep clock occurring during a predetermined measurement period as determined by a predetermined number of slow clock cycles (e.g., $2^{Msc}$). This means 810 could be implemented, as an example, with slow clock counter 304 and MSB counter 314 illustrated in FIG. 3.

The apparatus 800 also includes means for incrementing a fast clock count 812, which increments the fast clock count for each cycle of the fast clock. The means 812 could be implemented, for example, by fast clock counter 306 shown in FIG. 3. A means for storing the counted number of fast clock cycles 814 is in communication with the means for incrementing the fast clock count 812. This storing means 814 could be implemented by registers 1 through N (310, 318, 322) of FIG. 3, as an example.

Further, the apparatus 800 includes means for determining a number of sleep clock cycles from the sleep clock count 816. As an example, this means 816 could be implemented with adder 326 illustrated in FIG. 3, but could include other suitable logic or devices for determining a count. A complementary means for determining a number of fast clock cycles 818 is included to determine the number of fast clock cycles stored in the means for storing 814. This means 818 could be implemented, for example, by an adder such as adder 324 shown in FIG. 3. Again, this means 324 is not limited to an adder, but could include other suitable logic or devices for determining a count. Finally, the apparatus 800 includes a means for determining an estimated frequency of the sleep clock 820. Means 820, which is in communication with means 816 and 818, determines the estimated frequency based on the determined number of sleep clock cycles and the determined number of fast clock cycles. This means 820 could be implemented, for example, with the processor 112 illustrated in FIG. 1, or any other suitable device that is capable of computing or executing an algorithm.

The presently disclosed estimators above require no computation and can thus be implemented solely in hardware (except for the adders, which can be implemented in the microprocessor). Compared to the current design of the TCXO based sleep clock frequency estimator the presently disclosed sleep clock frequency estimator improves estimation accuracy by providing the microprocessor with the most recent estimate with longest possible and appropriate measurement period whenever the microprocessor requires. Additionally the disclosed constantly functioning estimators eliminate extra ±1 errors that can arise due to constant interruption of the fast clock counting process. Moreover, the disclosed estimators do not require intervention from the microprocessor (i.e., the microprocessor does not need to instruct the estimator when to start and when to stop counting).

The methods or algorithms described in connection with the examples disclosed herein may be embodied directly in hardware, in a software module executed by a processor, firmware, or in a combination of two or more of these. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The examples described above are merely exemplary and those skilled in the art may now make numerous uses of and departures from, the above-described examples without departing from the inventive concepts disclosed herein. Various modifications to these examples may be readily apparent to those skilled in the art, and the generic principles defined herein may be applied to other examples, e.g., in an instant messaging service or any general wireless data communication applications, without departing from the spirit or scope of the novel aspects described herein. Thus, the scope of the disclosure is not intended to be limited to the examples shown herein but is to be accorded the widest scope consistent with the principles and novel features disclosed herein. The word "exemplary" is used exclusively herein to mean "serving as an example, instance, or illustration." Any example described herein as "exemplary" is not necessarily to be construed as preferred or advantageous over other examples. Accordingly, the novel aspects described herein is to be defined solely by the scope of the following claims.

What is claimed is:

1. A sleep clock frequency estimator comprising:
   a first counter configured to count sleep clock synchronized pulses having a period corresponding to a period of a sleep clock and synchronized with a fast clock, and to output at least one full count signal when a number of sleep clock synchronized pulses reaches a predetermined number;
   a second counter configured to receive the full count signal and increment by a count of one for each full count signal received; and
   a third counter configured to count fast clock cycles, and output a value of the number of fast clock cycles to at least a first register for storage by the first register for each sleep clock synchronized pulse cycle.

2. The sleep clock frequency estimator as defined in claim 1, further comprising:
   a synchronizer configured to receive a sleep clock signal and the fast clock signal, synchronize the sleep clock signal to the fast clock signal based on the fast clock signal, and output one or more of the sleep clock synchronized pulses to the first counter based on the synchronization of the sleep clock signal to the fast clock signal.

3. The sleep clock frequency estimator as defined in claim 1, wherein the first register is configured to output a stored count to a first adder for determining the count of fast clock cycles during a measurement time period and the first and second counters are configured to output a current count to an adder to detetmine a count of slow clock cycles occurring during the measurement time period.

4. The sleeps clock frequency estimator as defined in claim 1, further comprising:
   at least one additional register configured to store the value of the number of fast clock cycles counted by the third counter when the second counter is incremented by one.

5. The sleep clock frequency estimator as defined in claim 1, further comprising an "N" number of registers including the first and at least one additional register wherein the total measurement time of the estimator is determined based on the "N" number of registers.

6. The sleep clock frequency estimator as defined in claim 1, wherein storage by the first register is triggered by a delayed pulse corresponding in frequency to the sleep clock synchronized pulse but delayed with a predetermined delay behind the sleep clock synchronized pulse.

7. The sleep clock frequency estimator as defined in claim 6, wherein the predetermined delay is equal to one fast clock cycle.

8. The sleep clock frequency estimator as defined in claim 1, wherein the fast clock is a temperature compensated crystal oscillator.

9. The sleep clock frequency estimator as defined in claim 1, wherein the first counter, the second counter, the third counter and the first register all are operable within a fast clock domain driven by the fast clock.

10. A clock frequency estimator comprising:
   a synchronizer configured to receive a first clock signal and a second clock signal and to output at least one clock synchronization pulse for each cycle of the second clock as synchronized to the first clock;
   a first counter configured to. receive the at least one clock synchronization pulse, where the first counter is configured to increment a first count with each received clock synchronization pulse, and to output a full count signal when the first count reaches a predetermined number;
   a second counter configured to receive the full count signal and increment by a count of one each time the full count signal is received;
   a third counter configured to receive the first clock signal, increment a second count for each first clock cycle received, and output the second count; and
   at least one register configured to store the second count for each clock synchronization pulse received by the first counter.

11. The clock frequency estimator as defined in claim 10, wherein the at least one register is configured to output a stored count to a first adder for determining the count of first clock cycles during a measurement time period and the first and second counters are configured to each output a current count, to an adder to determine a count of second clock cycles occurring during the measurement time period.

12. The clock frequency estimator as defined in claim 10, further comprising:
   at least one additional register configured to sequentially receive the second count from the third counter each for each full count signal from one of the first and second counters.

13. The clock frequency estimator as defined in claim 12, further comprising an "N" number of registers including the first and at least one additional register wherein the total measurement time of the estimator is determined based on the "N" number of registers.

14. The clock frequency estimator as defined in claim 10, wherein storage by the first register is triggered by a delayed pulse corresponding in frequency to the sleep clock synchronized pulse but delayed with a predetermined delay behind the sleep clock synchronized pulse.

15. The clock frequency estimator as defined in claim 14, wherein the predetermined delay is equal to one cycle of the first clock signal.

16. The clock frequency estimator as defined in claim 10, wherein the first clock is a temperature compensated crystal oscillator.

17. The clock frequency estimator as defined in claim 10, wherein the first clock signal has a frequency greater than the second clock signal.

18. The clock frequency estimator as defined in claim 10, wherein all of the first counter, the second counter, the third counter and the at least one register are operable within a circuit domain driven by the first clock.

19. A processing circuit for use in a wireless transceiver comprising;
   a synchronizer configured to receive a fast clock signal output by a fast clock and a sleep clock signal output by a sleep clock and to output at least one sleep clock synchronization pulse for each cycle of the sleep clock as synchronized to the fast clock;
   a sleep clock frequency estimator including:
   a first counter configured to count sleep clock synchronized pulses having a period corresponding to a period of a sleep clock and synchronized with a fast clock, and to output at least one fill count signal when a number of sleep clock synchronized pulses reaches a predetermined number;
   a second counter configured to receive the full count signal and increment by a count of one for each full count signal received; and
   a third counter configured to count fast clock cycles, and output a value of the number of fast clock cycles to at least a first register for storage by the first register for each slow clock cycle; and
   a processor configured to receive the count of fast clock cycles during a measurement time period from the at least one register and determine a number of fast clock cycles occurring during the measurement period, to receive counts from the first and second counters and to determine a count of sleep clock cycles occurring during the measurement time period; and determine an estimation of the sleep clock frequency based on the determined counts of fast and slow clock cycles.

20. The processing circuit as defined in clam 19, wherein the estimator further comprises:
   at least one additional register configured to sequentially receive the second count from the third counter each for each full count signal from at least one of the first and second counters.

21. The processing circuit as defined in claim 20, further comprising an "N" number of registers including the first and at least one additional register wherein the total measurement time of the estimator is determined based on the "N" number of registers.

22. The processing circuit as defined in claim 19, wherein a predetermined delay is equal to one fast clock cycle.

23. The processing circuit as defined in claim 22, further comprising a delay circuit configured to issue the delayed pulse.

24. The processing circuit as defined in claim 19, wherein the fast clock is a temperature compensated crystal oscillator.

25. The processing circuit as defined in claim 19, wherein the processor is configured to determine the estimate of the slow clock frequency prior to placing the circuit into a sleep mode.

26. The processing circuit as defined in claim 19, wherein the first counter, the second counter, the third counter and the first register are operable within a fast clock domain driven by the fast clock.

27. A wireless device for use in a mobile communications network comprising:
- a synchronizer configured to receive a fast clock signal output by a fast clock and a sleep clock signal output by a sleep clock and to output at least one sleep clock synchronization pulse for each cycle of the sleep clock as synchronized to the fast clock;
- a sleep clock frequency estimator including:
- a first counter configured to count sleep clock synchronized pulses having a period corresponding to a period of a sleep clock and synchronized with a:fast clock, and to output at least one full count signal when a number of sleep clock synchronized pulses reaches a predetermined number;
- a second counter configured to receive the full count signal and increment by a count of one for each full count signal received; and
- a third counter configured to count fast clock cycles and output a value of the number of fast clock cycles to at least a first register for storage by the first register for each slow clock cycle; and
- a processor configured to receive the count of fast clock cycles during a measurement time period from the at least one register and determine a number of fast clock cycles occurring during the measurement period, to receive counts from the first and second counters and to determine a count of sleep clock cycles occurring during the measurement time period; and determine an estimation of the sleep clock frequency based on the determined counts of fast and slow clock cycles.

28. The wireless device as defined in claim 27, wherein the sleep clock frequency estimator further comprises:
- at least one additional register configured to sequentially receive the second count from the third counter each for each full count signal from at least one of the first and second counters.

29. The wireless device as defined in claim 28, further comprising an "N" number of registers including the first and at least one additional register wherein the total measurement time of the estimator is determined based on the "N" number of registers.

30. The wireless device as defined in claim 27, wherein storage by the first register is triggered by a delayed pulse corresponding in frequency to the sleep clock synchronized pulse but delayed with a predetermined delay behind the sleep clock synchronized pulse.

31. The wireless device as defined, in claim 30, wherein the predetermined delay is equal to one fast clock cycle.

32. The wireless device as defined in claim 27, further comprising a delay circuit configured to issue a delayed sleep clock synchronized pulse with a predetermined delay behind the sleep clock synchronized pulse and configured to trigger storage by the first register.

33. The wireless device as defined in claim 27, wherein the fast clock is a temperature compensated crystal oscillator.

34. The wireless device as defined in claim 27, wherein the processor is configured to determine the estimate of the slow clock frequency prior to placing the circuit into a sleep mode.

35. The wireless device as defined in claim 27, wherein the first counter, the second counter, the third counter and the first register are operable within a fast clock domain driven by the fast clock.

36. A method for estimating the frequency of a sleep clock with a fast clock comprising:
- incrementing a sleep clock counter for each cycle of the sleep clock occurring during a predetermined measurement period as determined by a predetermined number of slow clock cycles;
- incrementing a fast clockcounter for each cycle of the fast clock to determine a fast clock cycle count and storing the counted number of fast clock cycles in at least one register occurring during each slow clock cycle of the predetermined measurement period;
- determining a number of sleep clock cycles of the sleep clock counter and a number of fast clock cycles stored in the at least one register; and
- determining an estimated frequency of the sleep clock based on the determined number of sleep clock cycles and the determined number of fast clock cycles stored in the at least one register.

37. The method as defined in claim 36, wherein the predetermined measurement period is determined based on a set number of slow cycles to be counted.

38. The method as defined in claim 37, further comprising:
- wherein the set number of slow cycles is greater than a count limit of the slow clock counter;
- shifting the count stored in the first register to at least a second register when the count limit of the slow clock is exceeded; and
- setting a most significant bit counter to count each occurrence of the count limit being exceeded.

39. A computer readable medium having instructions stored thereon, the stored instructions, when executed by a processor, cause the processor to perform a method of estimating the frequency of a sleep clock with a fast clock, the method comprising:
- incrementing a sleep clock counter for each cycle of the sleep clock occurring during a predetermined measurement period as determined by a predetermined number of slow clock cycles;
- incrementing a fast clock counter for each cycle of the fast clock to determine a fast clock cycle count and storing the counted number of fast clock cycles in at least one register occurring during each slow clock cycle of the predetermined measurement period;
- determining a number of sleep clock cycles of the sleep clock counter and a number of fast clock cycles stored in the at least one register; and
- determining an estimated frequency of the sleep clock based on the determined number of sleep clock cycles and the determined number of fast clock cycles stored in the at least one register.

40. The computer readable medium as defined in claim 39, wherein the predetermined measurement period is determined based on a set number of slow cycles to be counted.

41. The computer readable medium as defined in claim 40, further comprising:
- wherein the set number of slow cycles is greater than a count limit of the slow clock counter;
- shifting the count stored in the first register to at least a second register when the count limit of the slow clock is exceeded; and
- setting. a most significant bit counter to count each occurrence of the count limit being exceeded.

42. An apparatus for estimating the frequency of a sleep clock with a fast clock comprising:
- means for synchronizing a sleep clock with a fast clock and forming a synchronized pulse for each slow clock cycle synchronized with the fast clock;

means for incrementing a sleep clock count for each cycle of the sleep clock occurring during a predetermined measurement period as determined by a predetermined number of slow clock cycles;

means for incrementing a fast clock count for each cycle of the fast clock to determine a fast clock cycle count;

means for storing the counted number of fast clock cycles occurring during each slow clock cycle of the predetermined measurement period;

means for determining a number of sleep clock cycles from the sleep clock count;

means for determining a number of fast clock cycles stored in the means for storing; and means for determining an estimated frequency of the sleep clock based on the determined number of sleep clock cycles and the determined number of fast clock cycles.

43. The apparatus as defined in claim 42, wherein the predetermined measurement period is determined based on a set number of slow cycles to be counted.

44. The apparatus as defined in claim 43, further comprising:

means for shifting the count stored in the first register to at least a second register when the count limit of the slow clock is exceeded; and means for setting a most significant bit counter to count each occurrence of the count limit being exceeded; and wherein the set number of slow cycles is greater than a count limit of the slow clock counter.

* * * * *